United States Patent
Koezuka

(10) Patent No.: US 10,880,027 B2
(45) Date of Patent: Dec. 29, 2020

(54) SENSOR, INFORMATION PROCESSING DEVICE, SENSOR CONTROL METHOD, INFORMATION PROCESSING METHOD AND NON-TRANSITORY COMPUTER-READABLE STORAGE MEDIUM

(71) Applicant: OMRON Corporation, Kyoto (JP)

(72) Inventor: Yahiro Koezuka, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/276,554

(22) Filed: Feb. 14, 2019

(65) Prior Publication Data

US 2019/0305864 A1  Oct. 3, 2019

(30) Foreign Application Priority Data

Mar. 30, 2018 (JP) ................. 2018-069111

(51) Int. Cl.
| | |
|---|---|
| *H04J 3/06* | (2006.01) |
| *G06K 7/00* | (2006.01) |
| *B25J 9/16* | (2006.01) |
| *G01D 1/18* | (2006.01) |
| *G05B 19/401* | (2006.01) |

(52) U.S. Cl.
CPC .......... *H04J 3/0635* (2013.01); *B25J 9/1694* (2013.01); *G01D 1/18* (2013.01); *G05B 19/401* (2013.01); *G06K 7/0008* (2013.01); *G05B 2219/37532* (2013.01); *G05B 2219/40599* (2013.01)

(58) Field of Classification Search
None
See application file for complete search history.

(56) References Cited

U.S. PATENT DOCUMENTS

| 7,714,526 B2 * | 5/2010 | Kawakura | ............. H02H 3/006 318/432 |
|---|---|---|---|
| 2012/0159916 A1 * | 6/2012 | Ishii | ....................... B60L 58/40 56/10.2 A |

(Continued)

FOREIGN PATENT DOCUMENTS

| CN | 101195221 | 6/2008 |
|---|---|---|
| CN | 103085068 | 5/2013 |

(Continued)

OTHER PUBLICATIONS

Arash Khassetarash et al., "How can I synchronize EMG and acceleration data?", Jun. 6, 2016, Available at: https://www.researchgate.net/post/How_can_I_synchronize_EMG_and_acceleration_data.

(Continued)

Primary Examiner — Carlos Garcia
(74) Attorney, Agent, or Firm — JCIPRNET

(57) ABSTRACT

The present disclosure is to enable simplification of processing for analyzing each sensor value. Provided is a sensor including a continuous excess detection part that detects a continuous excess state, which is a state where an absolute value of a sensor value exceeds a predetermined threshold value continuously for a predetermined period of time and a start specification part that specifies an operation start timing of a robot on the basis of a timing when the continuous excess state is detected.

20 Claims, 9 Drawing Sheets

(56) References Cited

U.S. PATENT DOCUMENTS

| | | | | |
|---|---|---|---|---|
| 2013/0073086 | A1* | 3/2013 | Motoyoshi | G05B 15/00 700/258 |
| 2015/0311815 | A1* | 10/2015 | Nedic | H02M 7/003 363/21.01 |
| 2016/0229015 | A1* | 8/2016 | Takahashi | B23Q 17/0976 |
| 2017/0035313 | A1 | 2/2017 | Hong et al. | |
| 2017/0106535 | A1* | 4/2017 | Yamaoka | B25J 9/1651 |
| 2018/0106586 | A1* | 4/2018 | Gruber | G01B 21/045 |
| 2018/0321322 | A1* | 11/2018 | Morita | H02P 29/0241 |
| 2019/0061054 | A1* | 2/2019 | Mizuno | B23K 26/705 |
| 2019/0358824 | A1* | 11/2019 | Takeuchi | B25J 9/1633 |

FOREIGN PATENT DOCUMENTS

| | | |
|---|---|---|
| CN | 104608113 | 5/2015 |
| CN | 104827473 | 8/2015 |
| CN | 107645980 | 1/2018 |
| DE | 102004024388 | 12/2005 |
| JP | 2014178952 | 9/2014 |
| JP | 2015076805 | 4/2015 |
| JP | 2017016187 | 1/2017 |

OTHER PUBLICATIONS

"Search Report of Europe Counterpart Application", dated Aug. 23, 2019, p. 1-p. 9.
"Office Action of China Counterpart Application", dated Jun. 9, 2020, with English translation thereof, pp. 1-19.

* cited by examiner

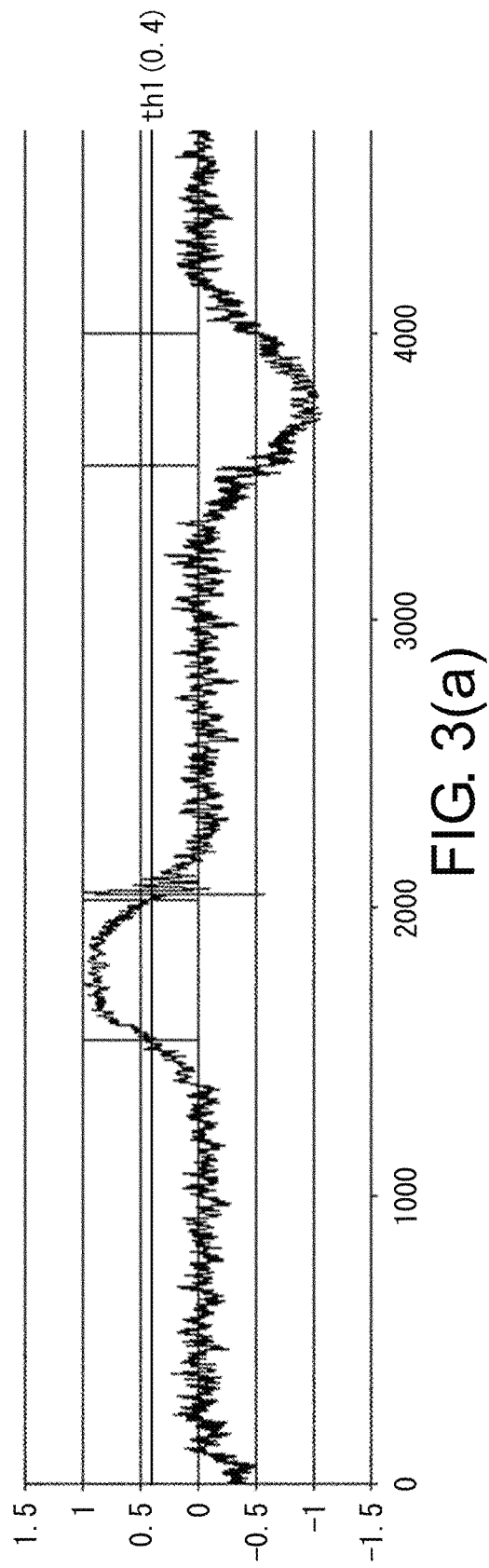
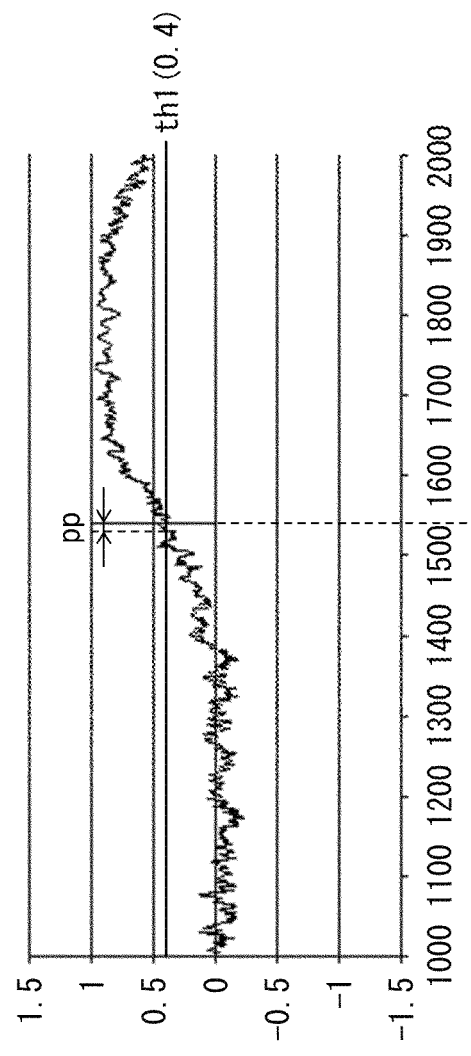
FIG. 3(a)
FIG. 3(b)

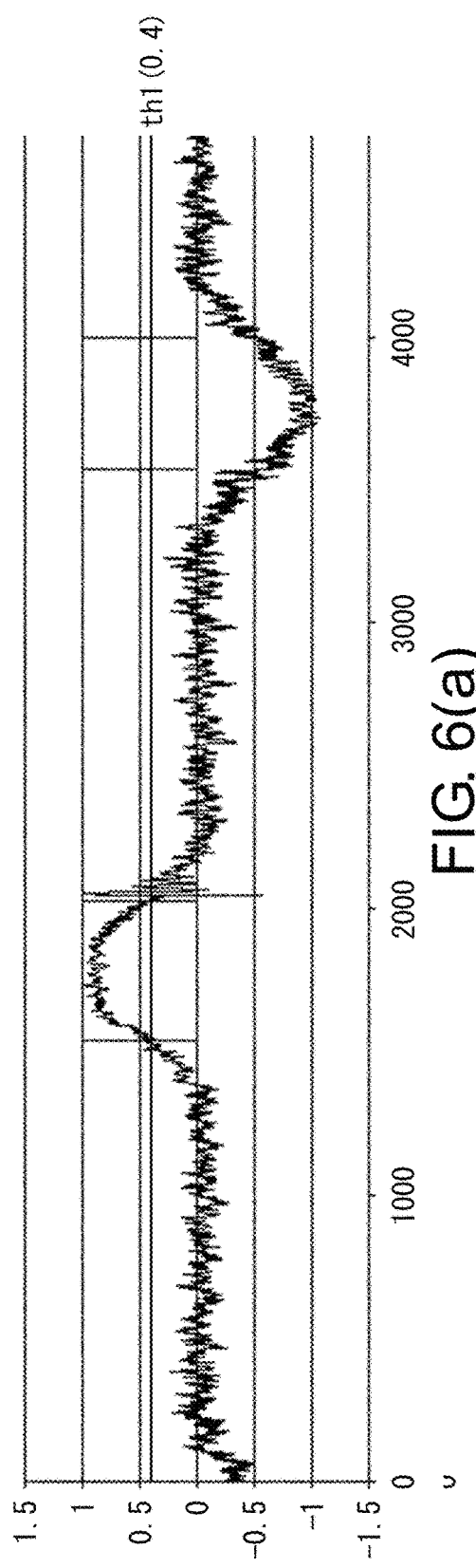
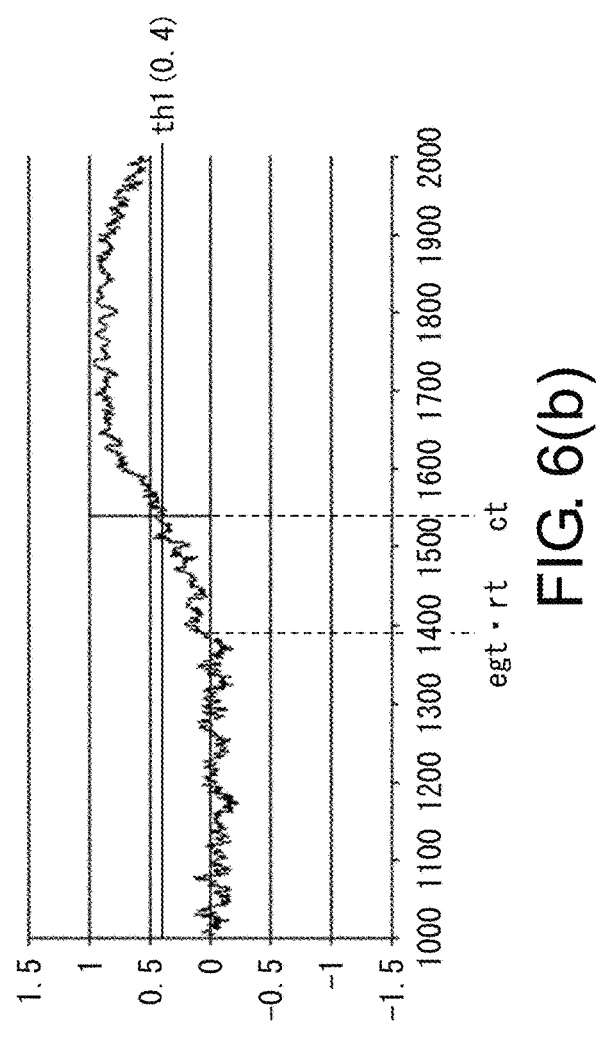
FIG. 6(a)
FIG. 6(b)

SENSOR, INFORMATION PROCESSING
DEVICE, SENSOR CONTROL METHOD,
INFORMATION PROCESSING METHOD
AND NON-TRANSITORY
COMPUTER-READABLE STORAGE
MEDIUM

CROSS-REFERENCE TO RELATED
APPLICATION

This application claims the priority benefit of Japan Application No. 2018-069111, filed on Mar. 30, 2018. The entirety of the above-mentioned patent application is hereby incorporated by reference herein and made a part of this specification.

BACKGROUND

Technical Field

The present disclosure relates to a sensor, an information processing device, a sensor control method, an information processing method, a program, and a storage medium.

Description of Related Art

In recent years, a technique for attaching a plurality of sensors to a driving device such as a robot to detect the movement of the driving device on the basis of sensor values of the plurality of sensors has become known.

In the technique, it is important to synchronize changes over time in the sensor values. A technique for synchronizing changes over time in the sensor values is a technique for associating a synchronization signal and each of the sensor values with each other (see Patent Document 1 and Patent Document 2).

PATENT DOCUMENTS

[Patent Document 1] Japanese Laid-open No. 2014-178952 (disclosed on Sep. 25, 2014)
[Patent Document 2] Japanese Laid-open No. 2015-76805 (disclosed on Apr. 20, 2015)
[Patent Document 3] Japanese Laid-open No. 2017-16187 (disclosed on Jan. 19, 2017)

In a case where the changes over time in the sensor values are not synchronized accurately, it is difficult to compare the changes over time in the sensor values with each other. As a result, there is a problem in that processing for analyzing the sensor values in order to detect the movement of the driving device becomes complicated.

The present disclosure is to realize a sensor, an information processing device, a sensor control method, an information processing method, a program, and a storage medium which are capable of simplifying processing for analyzing each sensor value.

SUMMARY

A sensor according to an aspect of the present disclosure is a sensor which is attached to a driving device including a plurality of joints and acquires a sensor value corresponding to an acceleration measurement result of the sensor, the sensor including a continuous excess detection part that detects a continuous excess state, which is a state where an absolute value of the sensor value exceeds a predetermined threshold value continuously for a predetermined period of time, and a start specification part that specifies an operation start timing of the driving device on the basis of a timing when the continuous excess state is detected.

An information processing device according to another aspect of the present disclosure is an information processing device that acquires a sensor value corresponding to an acceleration measurement result of at least one sensor attached to a driving device including a plurality of joints, the information processing device including a continuous excess detection part that detects a continuous excess state, which is a state where an absolute value of the sensor value exceeds a predetermined threshold value continuously for a predetermined period of time with respect to the at least one sensor, and a start specification part that specifies an operation start timing of the driving device in a change over time in the sensor value on the basis of a timing when the continuous excess state is detected with respect to the at least one sensor.

A sensor control method according to still another aspect of the present disclosure is a sensor control method of controlling a sensor which is attached to a driving device including a plurality of joints and acquires a sensor value corresponding to an acceleration measurement result of the sensor, the sensor control method including a continuous excess detection step of detecting a continuous excess state, which is a state where an absolute value of the sensor value exceeds a predetermined threshold value continuously for a predetermined period of time, and a start specification step of specifying an operation start timing of the driving device on the basis of a timing when the continuous excess state is detected.

An information processing method according to still another aspect of the present disclosure is an information processing method of processing a sensor value corresponding to an acceleration measurement result of at least one sensor attached to a driving device including a plurality of joints, the information processing method including a reception step of receiving the sensor value from the at least one sensor, a continuous excess detection step of detecting a continuous excess state, which is a state where an absolute value of the sensor value exceeds a predetermined threshold value continuously for a predetermined period of time with, respect to the at least one sensor, and a start specification step of specifying an operation start timing of the driving device in a change over time in the sensor value on the basis of a timing when the continuous excess state is detected with respect to the at least one sensor.

The sensor control method according to the aspect of the present disclosure may be executed by the computer. In this case, a program causing the computer to execute the sensor control method and a computer readable storage medium having the program recorded thereon are also included in the scope of the present disclosure. This is the same as in the information processing method according to the aspect of the present disclosure.

BRIEF DESCRIPTION OF THE DRAWINGS

FIG. 3(a) is a graph showing changes over time in an example of sensor values corresponding to measurement results of the first sensor and also shows the principle of specification of an operation start timing of a driving device, and FIG. 3(b) is an enlarged view of changes over time in an example of sensor values before and after a timing when a continuous excess state is detected.

FIG. 6(a) is a graph showing changes over time in an example of sensor values corresponding to measurement results of the first sensor and also shows another principle of specification of an operation start timing of the driving device, and FIG. 6(b) is an enlarged view of changes over time in an example of sensor values before and after a timing when a continuous excess state is detected.

DESCRIPTION OF THE EMBODIMENTS

Hereinafter, an embodiment according to an aspect of the present disclosure (hereinafter, also referred to as "the present embodiment") will be described with reference to the accompanying drawings. However, the present embodiment described below is not limited to examples in the present disclosure in all respects. It is needless to say that various improvements and modifications can be made without departing from the scope of the present disclosure. That is, a specific configuration according to the embodiment may be appropriately adopted in implementing the present disclosure.

§ 1 Application Example

Figure 1:
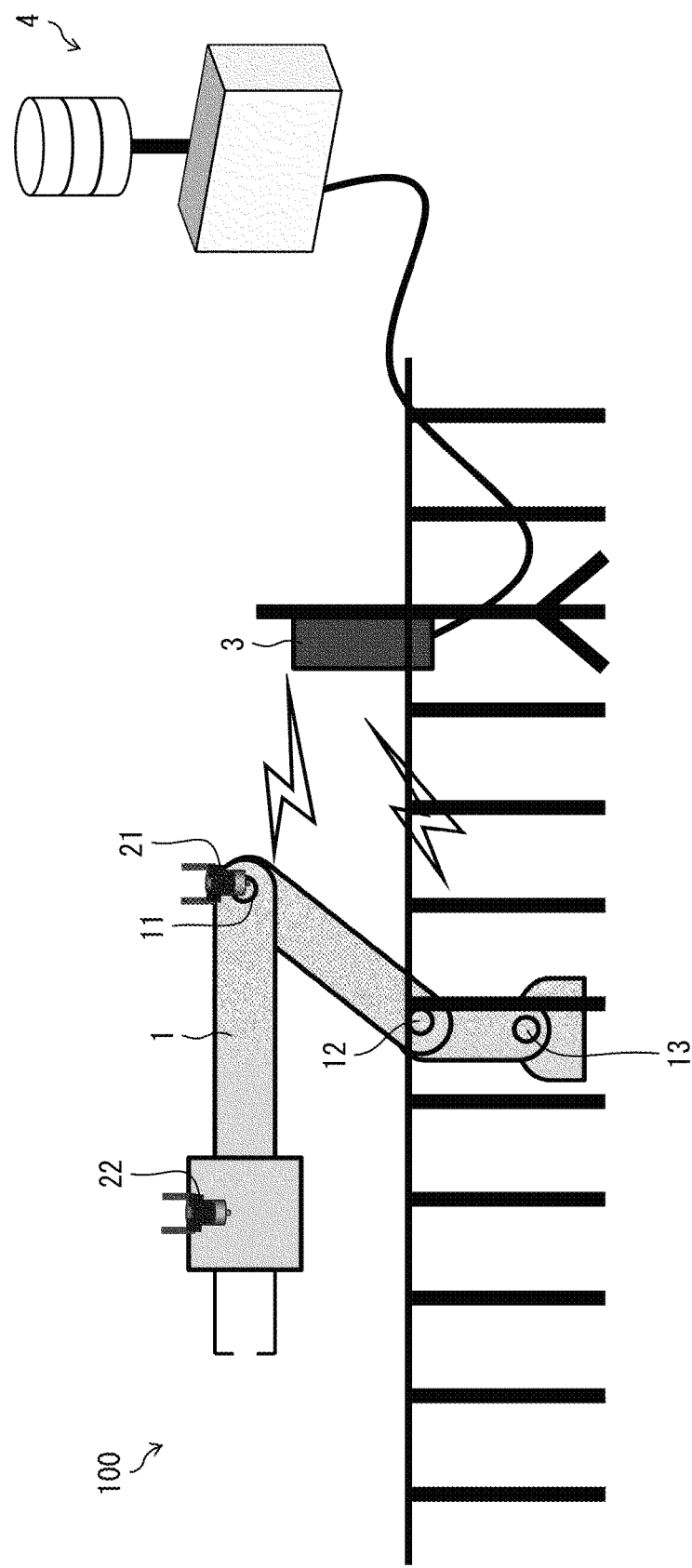
FIG. 1 is a schematic view of a robot system according to the present disclosure.

FIG. 1 is a schematic view of a robot system 100 according to the present disclosure. The robot system 100 includes a robot 1, a first sensor 21, a second sensor 22, sensor reader/writer (hereinafter, referred to as "a sensor R/W") 3, and a controller 4 including a database.

The robot 1 is a driving device performing work in, for example, a factory, and includes a plurality of joints 11, 12, and 13.

Each of the first sensor 21 and the second sensor 22 is attached to the robot 1 and measures change in a physical quantity accompanying movement of the robot 1. Each of the first sensor 21 and the second sensor 22 acquires a measurement result of the change in the physical quantity as a sensor value. That is, each of the first sensor 21 and the second sensor 22 acquires a sensor value corresponding to its own measurement result.

Note that an example of the physical quantity is an acceleration. An absolute value of the acceleration is approximately zero when the robot 1 is not operating, and increases significantly from a timing when the robot 1 starts to operate.

The sensor R/W 3 communicates with each of the first sensor 21 and the second sensor 22, and acquires information including sensor values from each of the first sensor 21 and the second sensor 22 or performs the setting of each of the first sensor 21 and the second sensor 22. A mode of communication between each of the first sensor 21 and the second sensor 22 and the sensor R/W 3 is preferably a wireless mode, but may be a wired mode.

The controller 4 communicates with the sensor R/W 3 and is an information processing device controlling the entire robot system 100. The controller 4 receives information including sensor values in each of the first sensor 21 and the second sensor 22 from the sensor R/W 3 (a reception step of receiving sensor values from at least one sensor). The controller 4 visualizes or analyzes the same changes over time by displaying the changes over time in sensor values on a display (not shown) connected to the controller 4. A mode of communication between the sensor R/W 3 and the controller 4 may be a wireless mode or may be a wired mode such as Ethernet (registered trademark).

It is possible to detect movement of the robot 1 by analyzing information including sensor values in each of the first sensor 21 and the second sensor 22. An example of the movement of the robot 1 is vibration of the robot 1 caused by a trouble in the robot 1. It is possible to detect vibration of the robot 1 by detecting that a change over time in a sensor value acquired by the first sensor 21 and/or the second sensor 22 includes unexpected high-frequency vibration. From the above, it can be said that the first sensor 21, the second sensor 22, the sensor R/W 3, and the controller 4 are constituent elements of a system detecting a trouble in the robot 1.

For example, when the robot 1 suddenly has a trouble in an automobile factory, serious damage may be caused in the manufacture of parts. In order to reliably detect such a trouble or signs thereof on the basis of the movement of the robot 1, it is important to synchronize changes over time in sensor values in each of the first sensor 21 and the second sensor 22 in the robot system 100. This is because it becomes difficult to compare the changes over time in the sensor values with each other in a case where the changes over time in the sensor values are not accurately synchronized with each other.

Figure 2:
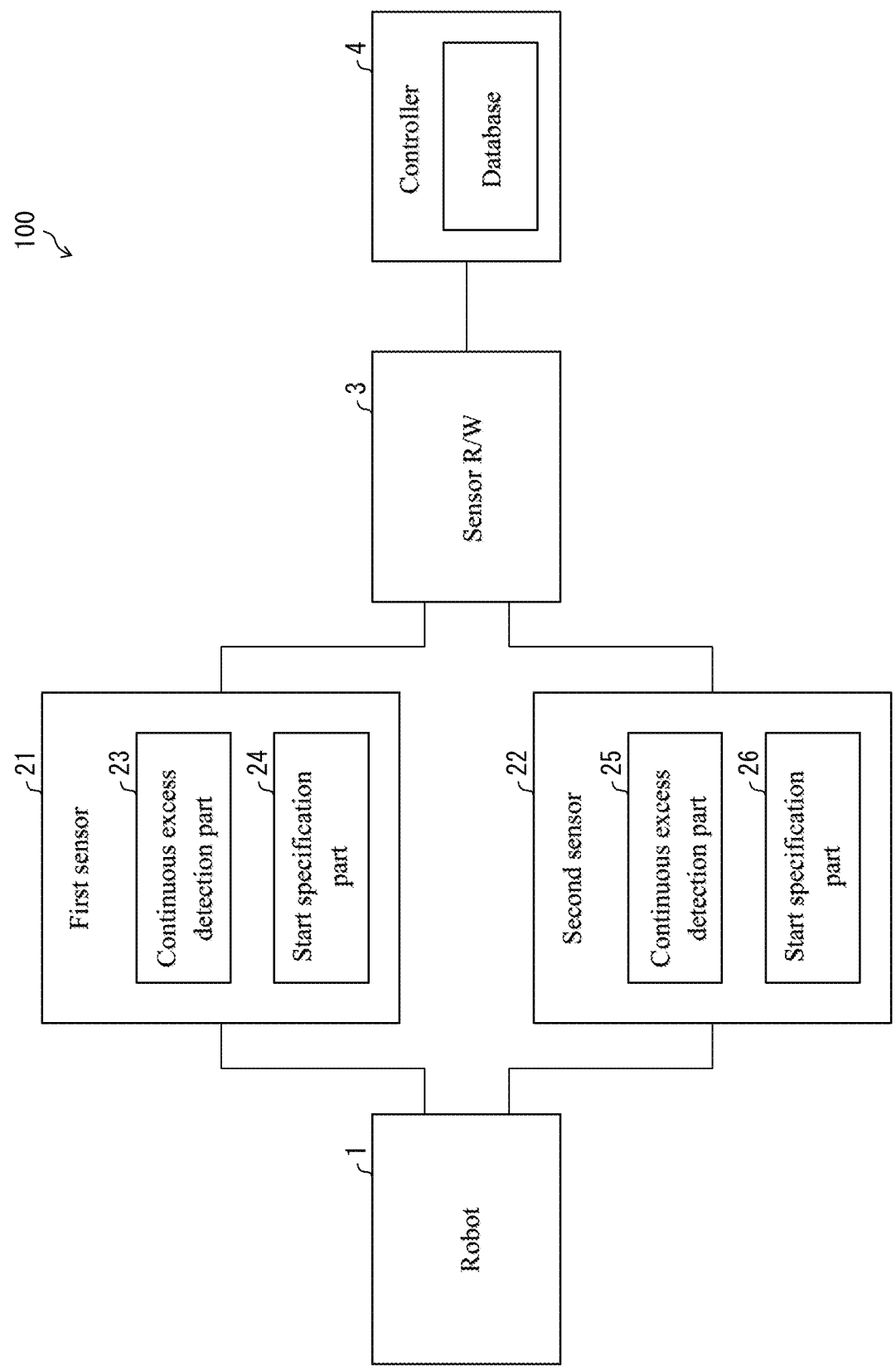
FIG. 2 is a block diagram showing a specific example of the robot system shown in FIG. 1 and shows an example in which the robot system includes a first sensor which is a sensor according to an embodiment according to an aspect of the present disclosure.

FIG. 2 is a block diagram showing a specific example of the robot system 100 shown in FIG. 1 and shows an example in which the robot system includes the first sensor 21 which is a sensor according to the present embodiment.

FIG. 3(a) is a graph showing changes over time in an example of sensor values corresponding to measurement results of the first sensor 21 and also shows the principle of specification of an operation start timing of the robot 1. FIG. 3(b) is an enlarged view of changes over time in an example of sensor values before and after a timing ct when a continuous excess state is detected.

The first sensor 21 includes a continuous excess detection part 23 and a start specification part 24. The continuous excess detection part 23 detects a continuous excess state, which is a state where an absolute value of a sensor value corresponding to a measurement result of the first sensor 21 exceeds a predetermined threshold value th1 continuously for a predetermined period of time pp. The start specification part 24 specifies an operation start timing of the robot 1 on the basis of the timing ct when the continuous excess state is detected. Hereinafter, the operation start timing of the robot 1 specified by the start specification part 24 will be referred to as a timing rt.

In the graphs shown in FIGS. 3(*a*) and 3(*b*), the horizontal axis represents a time and the acquisition of an n-th (n is an integer equal to or greater than 0) sensor value, and a numerical value on the horizontal axis corresponds to n. In the graphs shown in FIGS. 3(*a*) and 3(*b*), the vertical axis represents a sensor value, and more particularly, an acceleration (unit: G). Note that a time between the acquisition of an n-th sensor value and the acquisition of an (n+1)-th sensor value is, for example, 300 μs (microseconds).

Here, it is assumed that a predetermined period of time pp is a period of time equivalent to the acquisition of 20 consecutive sensor values. However, the predetermined period of time pp may be a period of time equivalent to the acquisition of more than 20 consecutive sensor values or may be a period of time equivalent to the acquisition of less than 20 consecutive sensor values. It is sufficient that the predetermined period of time pp is such a period of time that the continuous excess detection part 23 does not erroneously detect noise suddenly generated in a sensor value as a continuous excess state. In addition, here, the threshold value th1 is set to 0.4 G.

The continuous excess detection part 23 detects a continuous excess state at a timing of an (m+19)-th measurement when an absolute value of a sensor value exceeds the threshold value th1 in all of an m (m is an integer equal to or greater than 0)-th measurement, (m+1)-th measurement, (m+2)-th measurement, . . . , (m+18)-th measurement, and (m+19)-th measurement. In addition, the start specification part 24 sets a timing of an (m+19)-th measurement which is a timing ct when a continuous excess state is detected to be a timing rt.

Note that, in the example shown in FIG. 2, the second sensor 22 further has the same configuration as that of the first sensor 21. That is, the second sensor 22 includes a continuous excess detection part 25 that detects a continuous excess state, which is a state where an absolute value of a sensor value corresponding to a measurement result of the second sensor 22 exceeds a predetermined threshold value continuously for a predetermined period of time and a start specification part 26 that specifies an operation start timing of the robot 1 on the basis of a timing when the continuous excess state is detected.

According to the above-described configuration, an operation start timing of the robot 1 is specified from a change over time in a sensor value. The start specification part 24 specifies the operation start timing of the robot 1 on the basis of a continuous excess state, which is a state where an absolute value of a sensor value exceeds a predetermined threshold value th1 continuously for a predetermined period of time pp. For this reason, high-frequency noise or the like is not erroneously determined to be an operation start timing of the robot 1. In addition, for example, the timing rt is associated with a sensor value. Thereby, regarding a plurality of sensor values, it becomes easy to synchronize changes over time in the sensor values with each other with reference to timings rt corresponding to the sensor values. Therefore, according to the above-described configuration, it is possible to simplify processing for analyzing the sensor values.

§ 2 Configuration Example

The threshold value th1 is determined according to a position where the first sensor 21 is attached to the robot 1. Since movement may vary depending on a position in the robot 1, a change over time in a sensor value may vary depending on a position where the first sensor 21 is attached to the robot 1 in the first sensor 21. According to the above-described configuration, it is possible to determine the threshold value th1 which is sufficiently suitable for a change over time in a sensor value.

The first sensor 21 is attached to the joint 11 which is any one of the plurality of joints 11, 12, and 13. According to the above-described configuration, when a driving source (for example, a speed reducer) is disposed in the vicinity of the joint 11, a sensor value greatly varies in accordance with vibration of the robot 1 due to the driving source. As a result, it becomes easy to detect the vibration of the robot 1 due to the driving source using the first sensor 21.

Figure 4:
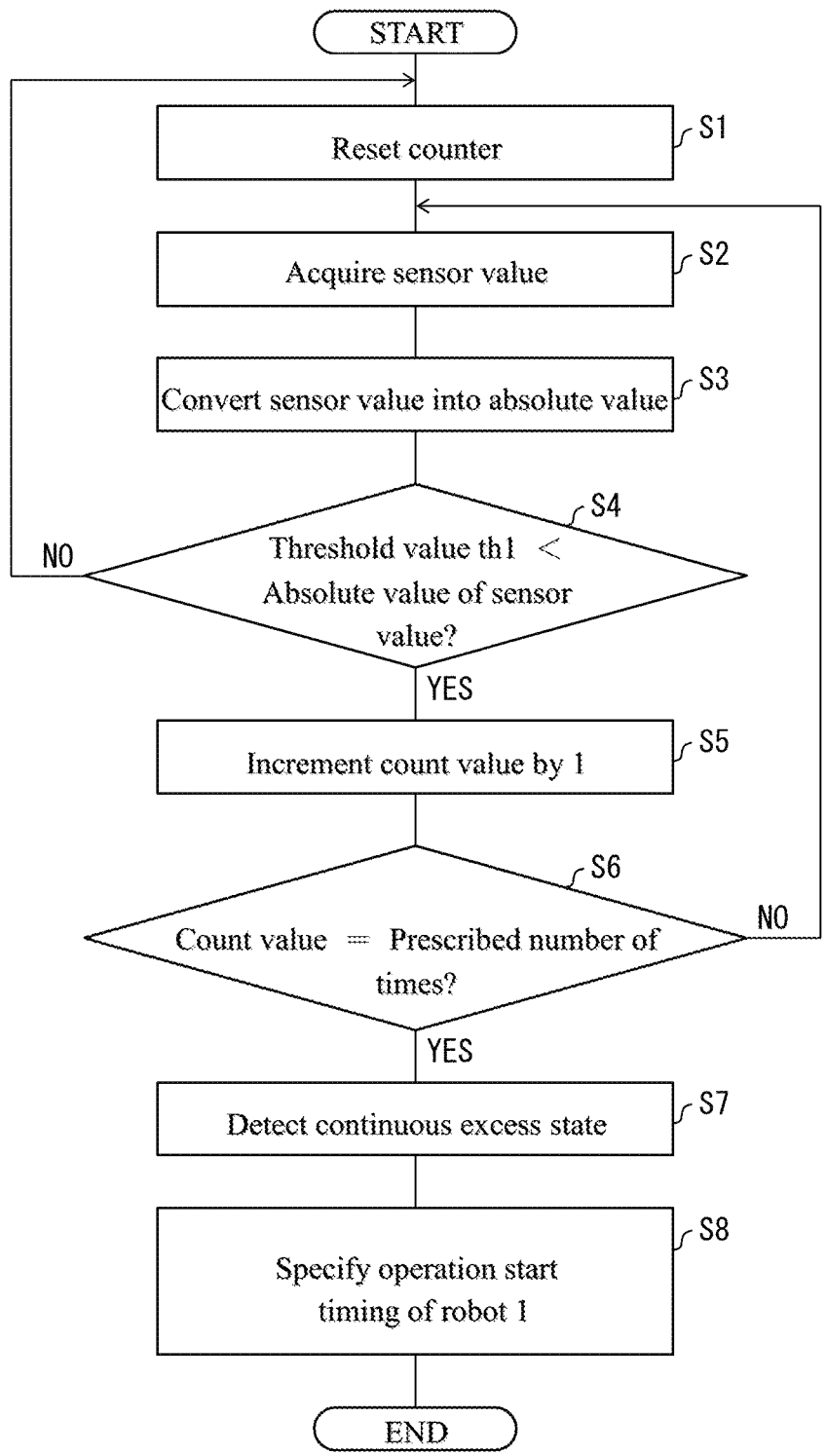
FIG. 4 is a flowchart showing a flow of operations in the first sensor.

FIG. 4 is a flowchart showing a flow of operations in the first sensor 21. FIG. 4 shows an example in which the first sensor 21 is provided with a counter that counts the number of times an absolute value of a sensor value corresponding to a measurement result of the first sensor 21 exceeds a threshold value th1.

First, the continuous excess detection part 23 resets the counter (step S1).

Next, the first sensor 21 acquires a sensor value corresponding to its own measurement result (step S2).

Next, the continuous excess detection part 23 converts the sensor value acquired in step S2 into an absolute value (step S3).

Next, the continuous excess detection part 23 determines whether or not the absolute value of the sensor value exceeds the threshold value th1 (step S4). When the absolute value of the sensor value does not exceed the threshold value th1 in step S4, the processing proceeds to step S1.

When the absolute value of the sensor value exceeds the threshold value th1 in step S4, the continuous excess detection part 23 increments a counted value of the counter by 1 (step S5). Next, the continuous excess detection part 23 determines whether or not the counted value reaches a prescribed number of times (step S6). Note that, in a case where the predetermined period of time pp is a period of time equivalent to acquisition of q (q is a natural number) consecutive sensor values, the prescribed number of times is q.

In a case where the counted value does not reach the prescribed number of times in step S6, the processing proceeds to step S2.

In a case where the counted value reaches the prescribed number of times in step S6, the continuous excess detection part 23 detects a continuous excess state (step S7), and next, the start specification part 24 specifies an operation start timing of the robot 1 (step S8).

In the flow of the operations in the first sensor 21 shown in FIG. 4, an operation executed by the continuous excess detection part 23 is equivalent to a continuous excess detection step, and an operation executed by the start specification part 24 is equivalent to a start specification step.

Figure 5:
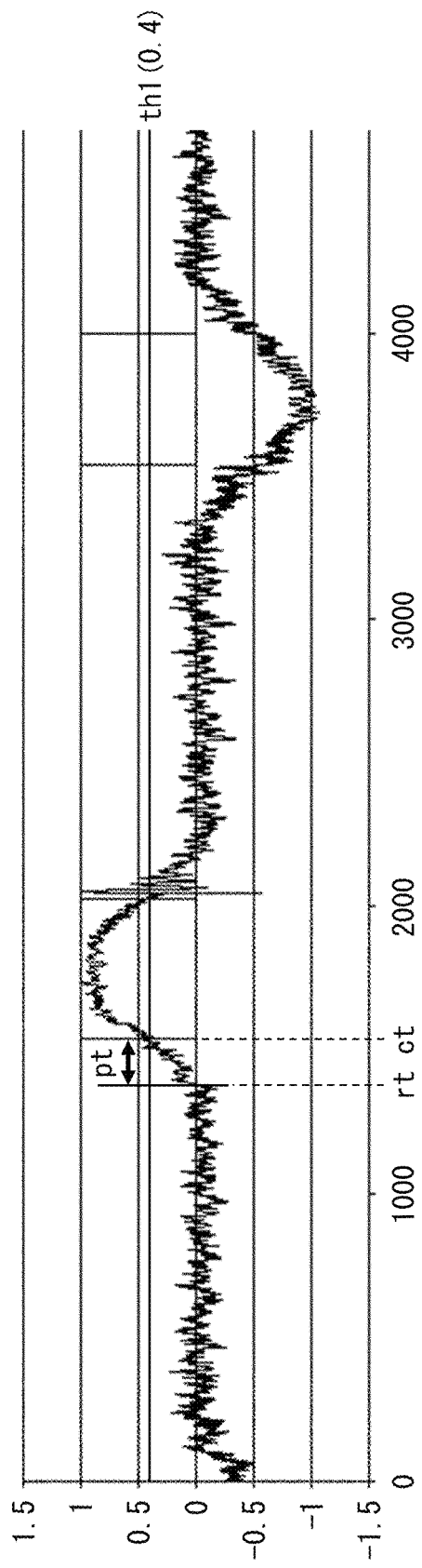
FIG. 5 is a graph showing changes over time in an example of sensor values corresponding to measurement results of the first sensor and also shows another principle of specification of an operation start timing of the driving device.

FIG. 5 is a graph showing changes over time in an example of sensor values corresponding to measurement results of the first sensor 21 and also shows another principle of specification of an operation start timing of the robot 1. Definition of the horizontal axis and definition of the vertical axis in the graph shown in FIG. 5 are respectively the same as the definition of the horizontal axis and the definition of the vertical axis in the graph shown in FIG. 3(*a*).

The graph shown in FIG. 5 shows an example in which the start specification part 24 sets a timing before by a predetermined time pt with respect to the timing ct when a continuous excess state is detected to be a timing rt. In this manner, the start specification part 24 may set a timing before by a predetermined time pt with respect to the timing ct when a continuous excess state is detected to be a timing rt.

The timing ct when a continuous excess state is detected may be slightly later than a timing when the robot 1 actually starts to operate. According to the above-described configuration, in a case where a delay time of the timing ct when a continuous excess state is detected with respect to the timing when the robot 1 actually starts to operate is already known, it is possible to reduce a deviation between a specification result (that is, the timing rt) of the operation start timing of the robot 1 and the timing when the robot 1 actually starts to operate.

A specific example of a method of determining a predetermined time pt is as follows. That is, the first sensor 21 is made to learn an inclination (average value) of an acceleration with respect to a time corresponding to an operation pattern of the robot 1, and the predetermined time pt is determined from the inclination and the threshold value th1. The threshold value and the predetermined time pt may be different for each operation pattern of the robot 1.

FIG. 6(a) is a graph showing changes over time in an example of sensor values corresponding to measurement results of the first sensor 21 and also shows another principle of specification of an operation start timing of the robot 1. FIG. 6(b) is an enlarged view of changes over time in an example of sensor values before and after a timing ct when a continuous excess state is detected. Definition of the horizontal axis and definition of the vertical axis in the graphs shown in FIGS. 6(a) and 6(b) are respectively the same as the definition of the horizontal axis and the definition of the vertical axis in the graphs shown in FIGS. 3(a) and 3(b).

The graphs shown in FIGS. 6(a) and 6(b) show an example in which the start specification part 24 sets a timing egt when a magnitude relationship between a sensor value and an average value av of sensor values over at least a portion of a measurement period of the first sensor 21 eventually changes at a time before the timing ct when a continuous excess state is detected to be a timing rt. In this manner, the start specification part 24 may set the timing egt when a magnitude relationship between a sensor value and an average value av of sensor values over at least a portion of a measurement period of the first sensor 21 eventually changes at a time before the timing ct when a continuous excess state is detected to be the timing rt.

According to the above-described configuration, it is possible to reduce the deviation even when the delay time is not already known.

Figure 7:
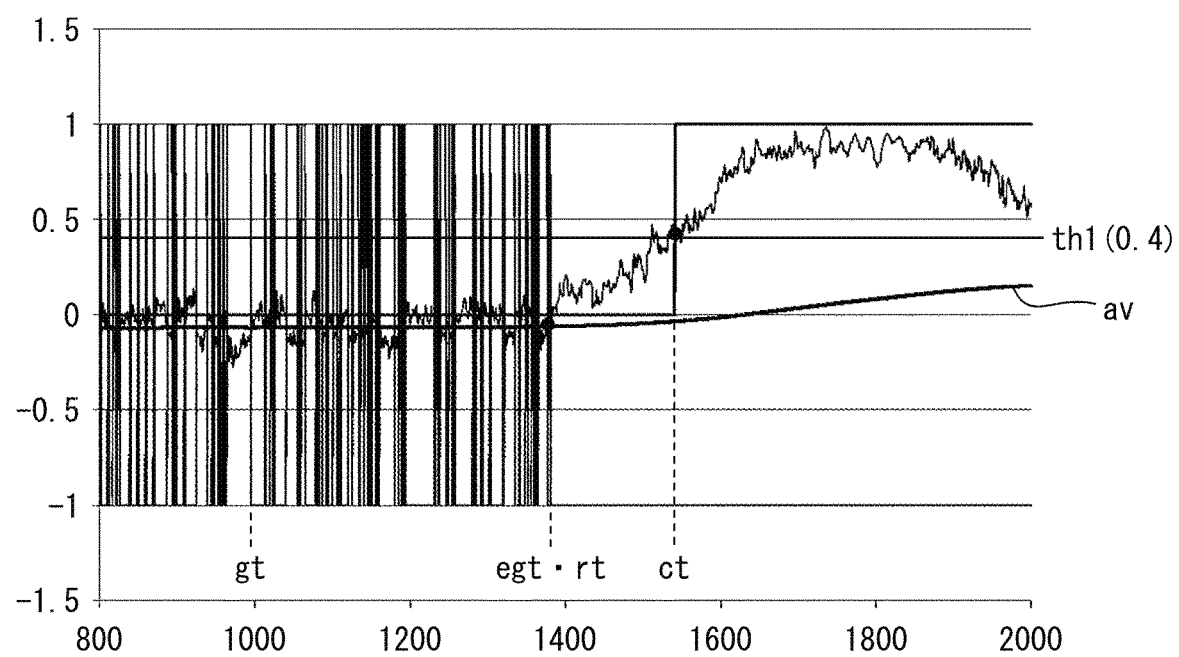
FIG. 7 is a graph subsidiarily illustrating the principle shown in FIGS. 6(a) and 6(b).

FIG. 7 is a graph subsidiarily illustrating the principle shown in FIGS. 6(a) and 6(b).

First, the start specification part 24 stores times when a magnitude relationship between a sensor value and an average value av of sensor values over a measurement period of the first sensor 21 changes. In FIG. 7, each of the times when the magnitude relationship changes is set to be a timing gt. Note that the average value av may be stored by any member.

Next, the continuous excess detection part 23 detects a continuous excess state. In FIG. 7, a timing when the continuous excess state is detected is subsequently set to be ct.

Next, the start specification part 24 sets the timing egt when the magnitude relationship eventually changes at a time before the timing ct when a continuous excess state is detected to be a timing rt.

The start specification part 24 imparts information regarding the specified timing rt to a change over time in a sensor value. According to the above-described configuration, the timing rt can be associated with a sensor value.

The continuous excess detection part 23 transmits changes over time in sensor values for at least a predetermined period of time pp to the controller 4 through the sensor R/W 3 when the continuous excess state is detected. According to the above-described configuration, it is possible to process the changes over time in the sensor values for at least the predetermined period of time pp by the controller 4. Note that Patent Document 3 discloses that data transmission is performed for only a period of time in which a physical quantity exceeds a threshold value, but there is no problem when the continuous excess detection part 23 transmits a change over time in sensor values to the controller 4 in a period of time when the sensor value is equal to or less than a threshold value th1.

Operations of the continuous excess detection part 25 and the start specification part 26 for the second sensor 22 are the same as the operations of the continuous excess detection part 23 and the start specification part 24 for the first sensor 21.

Figure 8:
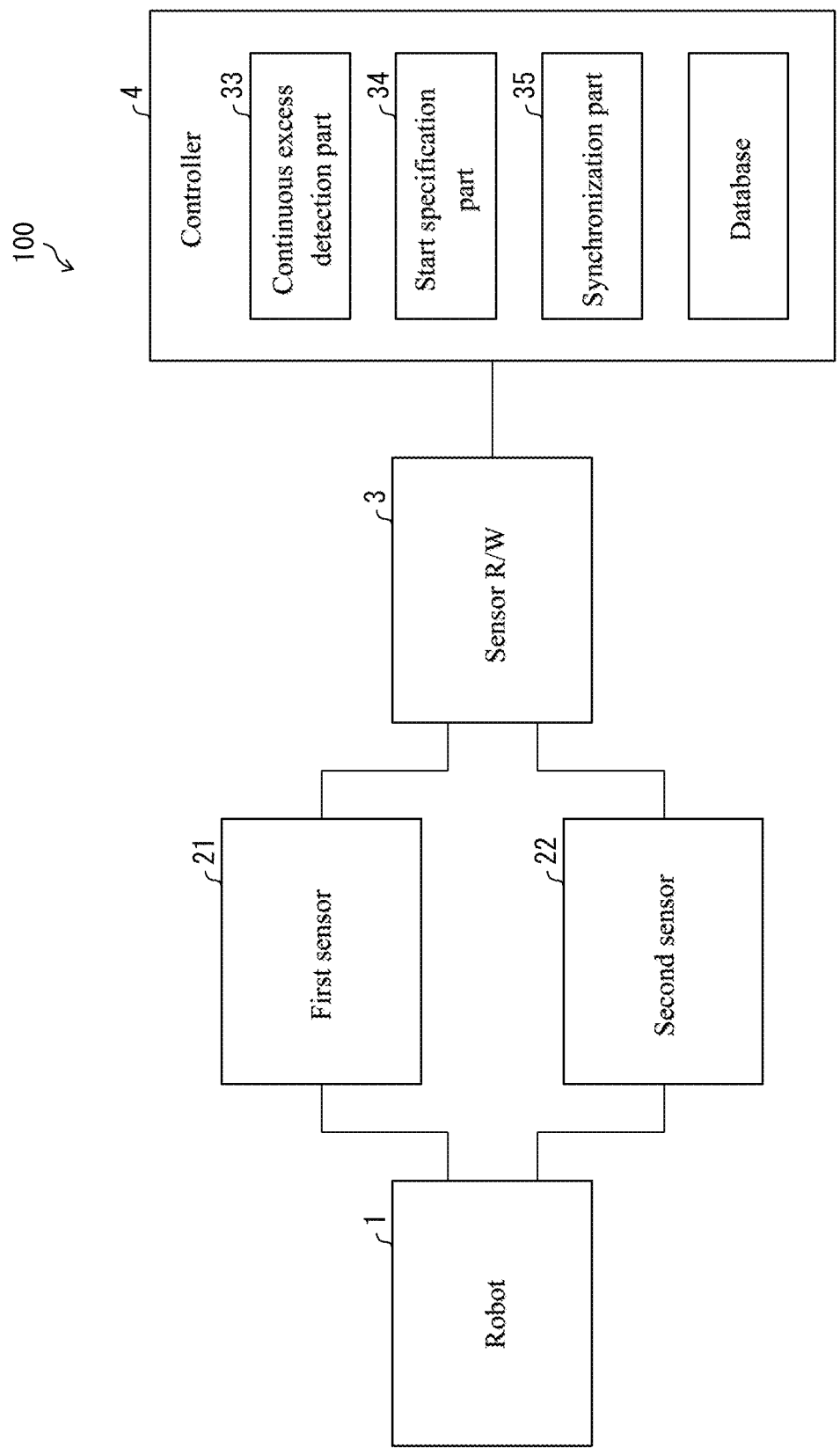
FIG. 8 is a block diagram showing another specific example of the robot system shown in FIG. 1 and shows an example in which the robot system includes an information processing device according to an embodiment according to an aspect of the present disclosure.

FIG. 8 is a block diagram showing another specific example of the robot system 100 shown in FIG. 1 and shows an example in which the robot system includes the controller 4 according to the present embodiment.

The controller 4 includes a continuous excess detection part 33, a start specification part 34, and a synchronization part 35.

The continuous excess detection part 33 detects a continuous excess state, which is a state where an absolute value of a sensor value corresponding to a measurement result of the first sensor 21 exceeds a predetermined threshold value th1 continuously for a predetermined period of time pp. The continuous excess detection part 33 detects a continuous excess state, which is a state where an absolute value of a sensor value corresponding to a measurement result of the second sensor 22 exceeds a predetermined threshold value continuously for a predetermined period of time. It can be said that the continuous excess detection part 33 is configured such that the continuous excess detection part 23 and the continuous excess detection part 25 described above are disposed in the controller 4 in combination with each other.

The start specification part 34 specifies an operation start timing (timing rt) of the robot 1 in the change over time in the sensor value on the basis of the timing ct when a continuous excess state is detected with respect to the first sensor 21. The start specification part 34 also specifies an operation start timing of the robot 1 in the change over time in the sensor value on the basis of a timing when a continuous excess state is detected with respect to the second sensor 22. It can be said that the start specification part 34 is configured such that the start specification part 24 and the start specification part 26 described above are disposed in the controller 4 in combination with each other.

The synchronization part 35 synchronizes a change over time in a sensor value of the first sensor 21 and a change over time in a sensor value of the second sensor 22 with each other with reference to the timing rt specified in response to the first sensor 21 and an operation start timing of the robot 1 specified in response to the second sensor 22.

In the configuration shown in FIG. 8, the same effects as those in the configuration shown in FIG. 2 are exerted. In addition, it is possible to synchronize a change over time in a sensor value of the first sensor 21 and a change over time in a sensor value of the second sensor 22 with each other by providing the synchronization part 35.

A threshold value th1 corresponding to the first sensor 21 and a predetermined threshold value corresponding to the second sensor 22 may be different from each other. According to the above-described configuration, it is possible to determine a predetermined threshold value which is sufficiently suitable for a change over time in a sensor value in each of the first sensor 21 and the second sensor 22. That is, in the first sensor 21 and the second sensor 22, changes over time in sensor values may vary due to a difference between a position where the first sensor 21 is attached and a position between the second sensor 22 is attached, and thus it is effective to appropriately determine a predetermined threshold value in a manner that is sufficiently suitable for the changes over time in the sensor values.

Figure 9:
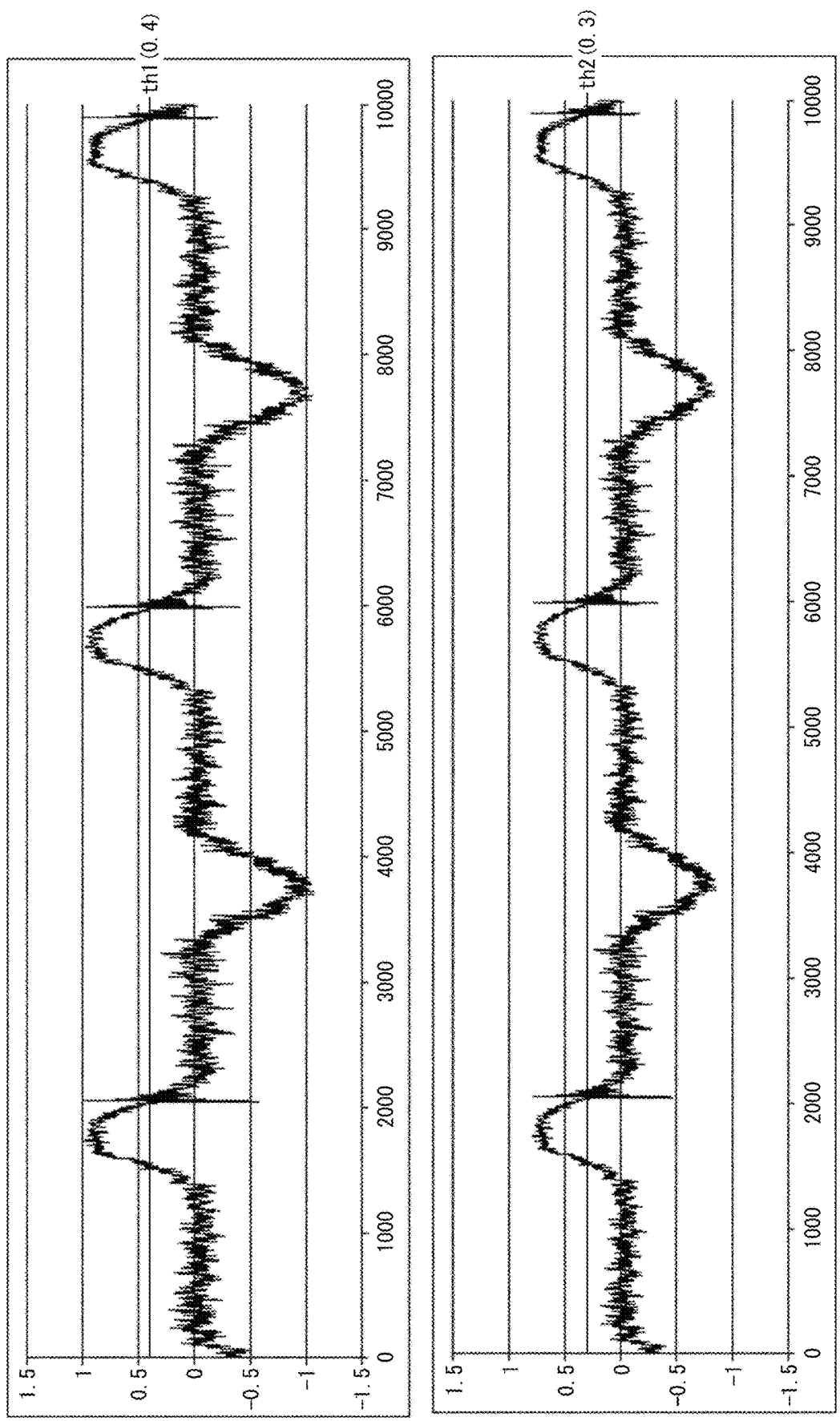
FIG. 9 is two graphs showing an example in which a predetermined threshold value corresponding to the first sensor and a predetermined threshold value corresponding to a second sensor are different from each other.

FIG. 9 is two graphs showing an example in which a threshold value th1 corresponding to the first sensor 21 and a predetermined threshold value (threshold value th2) corresponding to the second sensor 22 are different from each other. Definition of the horizontal axis and definition of the vertical axis in each of the two graphs are respectively the same as the definition of the horizontal axis and the definition of the vertical axis in the graph shown in FIG. 3(a). In the two graphs, the upper graph is a graph showing changes over time in an example of sensor values corresponding to measurement results of the first sensor 21, and the lower graph is a graph showing changes over time in an example of sensor values corresponding to measurement results of the second sensor 22. As described above, the threshold value th1 is set to 0.4 G. On the other hand, according to FIG. 9, there is a tendency for sensor values corresponding to measurement results of the second sensor 22 to be smaller than sensor values corresponding to measurement results of the first sensor 21 as a whole, and thus the threshold value th2 is set to 0.3 G in consideration of this. In this manner, the threshold value th1 and the threshold value th2 may be different from each other.

The controller 4 controls the operation of the robot 1, and the predetermined threshold value different for each operation pattern of the robot 1 may be used for the first sensor 21 and/or the second sensor 22. According to the above-described configuration, it is possible to determine a predetermined threshold value which is sufficiently suitable for a change over time in a sensor value.

In addition, a predetermined time pt corresponding to the first sensor 21 and a predetermined time corresponding to the second sensor 22 may be different from each other with respect to one operation pattern. This is because accelerations for the same operation pattern are different from each other due to a difference between locations where the first sensor 21 and the second sensor 22 are respectively disposed.

As the driving device, for example, a processing machine for working in a factory, an automatic guided vehicle (AGV), and the like are cited in addition to the robot 1.

Realization Example Using Software

Control blocks of the first sensor 21, the second sensor 22, and the controller 4 may be realized by a logic circuit (hardware) formed in an integrated circuit (IC chip) or the like or may be realized by software.

In the latter case, any one of the corresponding first sensor 21, second sensor 22, and controller 4 includes a computer that executes a command of a program which is software for realizing functions. The computer includes, for example, one or more processors and includes a computer readable storage medium storing the program. Further, in the computer, the processor reads the program from the storage medium and executes the program, so that the present disclosure is accomplished. As the processor, for example, a central processing unit (CPU) can be used. As the storage medium, "a non-transitory tangible medium", for example, a tape, a disc, a card, a semiconductor memory, a programmable logic circuit, and the like can be used in addition to a read only memory (ROM). In addition, a random access memory (RAM) developing the program, and the like may be further provided. In addition, the program may be supplied to the computer through any transmission medium (a communication network or broadcast waves) capable of transmitting the program. Note that an aspect of the present disclosure may also be realized in the form of a data signal embedded in carrier waves in which the program is embodied by electronic transmission.

According to the above-described configuration, the operation start timing of the driving device is specified from the change over time in the sensor value. The start specification part specifies the operation start timing of the driving device on the basis of the continuous excess state, which is a state where the absolute value of the sensor value exceeds the predetermined threshold value continuously for a predetermined period of time. For this reason, high-frequency noise or the like is not erroneously determined to be the operation start timing. In addition, for example, the operation start timing of the driving device is associated with the sensor value. Thereby, regarding a plurality of sensor values, it becomes easy to synchronize changes over time in the sensor values with each other with reference to the operation start timing of the driving device corresponding to each sensor value. Therefore, according to the above-described configuration, it is possible to simplify processing for analyzing the sensor values.

In the sensor according to the aspect of the present disclosure, the start specification part may set the timing when the continuous excess state is detected to be the operation start timing of the driving device.

In the sensor according to the aspect of the present disclosure, the start specification part sets a timing before by a predetermined time with respect to the timing when the continuous excess state is detected to be the operation start timing of the driving device.

The timing when the continuous excess state is detected may be slightly later than a timing when the driving device actually starts to operate. According to the above-described configuration, in a case where a delay time of the timing when the continuous excess state is detected with respect to the timing when the driving device actually starts to operate is already known, it is possible to reduce a deviation between a specification result of the operation start timing of the driving device and the timing when the driving device actually starts to operate.

In the sensor according to the aspect of the present disclosure, the start specification part sets a timing when a magnitude relationship between the sensor value and an average value of the sensor values over at least a portion of a measurement period of the sensor eventually changes at a time before the timing when the continuous excess state is detected to be the operation start timing of the driving device.

According to the above-described configuration, it is possible to reduce the deviation even when the delay time is not already known.

The sensor according to the aspect of the present disclosure is attached to any one of the plurality of joints.

According to the above-described configuration, when a driving source (for example, a speed reducer) is disposed in the vicinity of the joint, a sensor value greatly varies in accordance with vibration of the driving device due to the driving source. As a result, it becomes easy to detect vibration of the driving device due to the driving source using the sensor.

In the sensor according to the aspect of the present disclosure, the start specification part imparts information regarding the specified operation start timing of the driving device to changes over time in the sensor values.

According to the above-described configuration, the operation start timing of the driving device can be associated with the sensor value.

In the sensor according to the aspect of the present disclosure, the continuous excess detection part transmits the changes over time in the sensor values for at least the predetermined period of time to an information processing device processing the sensor values when the continuous excess state is detected.

According to the above-described configuration, it is possible to process the changes over time in the sensor values for at least the predetermined period of time with the information processing device.

In the information processing device according to the aspect of the present disclosure, the at least one sensor is a plurality of sensors including a first sensor and a second sensor, and the information processing device includes a synchronization part that synchronizes a change over time in the sensor value of the first sensor and a change over time in the sensor value of the second sensor with each other with reference to an operation start timing of the driving device which is specified in response to the first sensor and an operation start timing of the driving device which is specified in response to the second sensor.

According to the above-described configuration, it is possible to synchronize a change over time in a sensor value of the first sensor and a change over time in a sensor value of the second sensor with each other.

In the information processing device according to the aspect of the present disclosure, the predetermined threshold value corresponding to the first sensor and the predetermined threshold value corresponding to the second sensor may be different from each other.

According to the above-described configuration, it is possible to determine a predetermined threshold value which is sufficiently suitable for a change over time in a sensor value in each of the first sensor and the second sensor.

In the information processing device according to the aspect of the present disclosure, the information processing device controls operation of the driving device, and the predetermined threshold value which is different for each operation pattern of the driving device is used for the at least one sensor.

According to the above-described configuration, it is possible to determine a predetermined threshold value which is sufficiently suitable for a change over time in a sensor value.

According to an aspect of the present disclosure, it is possible to simplify processing for analyzing each sensor value.

The present disclosure is not limited to the above-described embodiments, and various modifications can be made in the scope described in claims. An embodiment obtained by appropriately combining technical means disclosed in different embodiments with each other is also included in the technical scope of the present disclosure.

What is claimed is:

1. A sensor, coupled to a driving device comprising a plurality of joints and acquires a sensor value corresponding to an acceleration measurement result of the sensor, the sensor comprising:
    a continuous excess detection part that detects a continuous excess state, which is a state where an absolute value of the sensor value exceeds a predetermined threshold value continuously for a predetermined period of time,
    wherein the predetermined threshold value is determined according to a position where the sensor is coupled to the driving device; and
    a start specification part that specifies an operation start timing of the driving device on the basis of a timing when the continuous excess state is detected,
    wherein in the state the absolute value of the sensor value does not exceed the predetermined threshold value continuously for the predetermined period of time, the start specification part does not specify the operation start timing of the driving device.

2. The sensor according to claim 1,
    wherein the start specification part sets the timing when the continuous excess state is detected to be the operation start timing of the driving device.

3. The sensor according to claim 2,
    wherein the sensor is attached to any one of the plurality of joints.

4. The sensor according to claim 2,
    wherein the start specification part imparts information regarding the specified operation start timing of the driving device to changes over time in the sensor values.

5. The sensor according to claim 2,
    wherein the continuous excess detection part transmits changes over time in the sensor values for at least the predetermined period of time to an information processing device processing the sensor values when the continuous excess state is detected.

6. The sensor according to claim 1,
    wherein the start specification part sets a timing before a predetermined time with respect to the timing when the continuous excess state is detected to be the operation start timing of the driving device.

7. The sensor according to claim 6,
    wherein the sensor is attached to any one of the plurality of joints.

8. The sensor according to claim 1,
    wherein the start specification part sets a timing when a magnitude relationship between the sensor value and an average value of the sensor values over at least a portion of a measurement period of the sensor eventually changes at a time before the timing when the continuous excess state is detected to be the operation start timing of the driving device.

9. The sensor according to claim 1,
    wherein the sensor is attached to any one of the plurality of joints.

10. The sensor according to claim 1,
    wherein the start specification part imparts information regarding the specified operation start timing of the driving device to changes over time in the sensor values.

11. The sensor according to claim 1,
wherein the continuous excess detection part transmits changes over time in the sensor values for at least the predetermined period of time to an information processing device processing the sensor values when the continuous excess state is detected.

12. An information processing device that acquires a sensor value corresponding to an acceleration measurement result of at least one sensor coupled to a driving device comprising a plurality of joints, the information processing device comprising:
  a continuous excess detection part that detects a continuous excess state, which is a state where an absolute value of the sensor value exceeds a predetermined threshold value continuously for a predetermined period of time, with respect to the at least one sensor,
  wherein the predetermined threshold value is determined according to a position where the sensor is coupled to the driving device; and
  a start specification part that specifies an operation start timing of the driving device in a change over time in the sensor value on the basis of a timing when the continuous excess state is detected with respect to the at least one sensor,
  wherein in the state the absolute value of the sensor value does not exceed the predetermined threshold value continuously for the predetermined period of time, the start specification part does not specify the operation start timing of the driving device.

13. The information processing device according to claim 12,
  wherein the at least one sensor is a plurality of sensors comprising a first sensor and a second sensor, and
  the information processing device comprises a synchronization part that synchronizes a change over time in the sensor value of the first sensor and a change over time in the sensor value of the second sensor with each other with reference to an operation start timing of the driving device which is specified in response to the first sensor and an operation start timing of the driving device which is specified in response to the second sensor.

14. The information processing device according to claim 13,
  wherein the predetermined threshold value corresponding to the first sensor and the predetermined threshold value corresponding to the second sensor are different from each other.

15. The information processing device according to claim 13,
  wherein the information processing device controls operation of the driving device, and
  the predetermined threshold value which is different for each operation pattern of the driving device is used for the at least one sensor.

16. The information processing device according to claim 12,
  wherein the information processing device controls operation of the driving device, and
  the predetermined threshold value which is different for each operation pattern of the driving device is used for the at least one sensor.

17. A sensor control method of controlling a sensor which is coupled to a driving device comprising a plurality of joints and acquires a sensor value corresponding to an acceleration measurement result of the sensor, the sensor control method comprising:
  a continuous excess detection step of detecting a continuous excess state, which is a state where an absolute value of the sensor value exceeds a predetermined threshold value continuously for a predetermined period of time,
  wherein the predetermined threshold value is determined according to a position where the sensor is coupled to the driving device; and
  a start specification step of specifying an operation start timing of the driving device on the basis of a timing when the continuous excess state is detected,
  wherein in the state the absolute value of the sensor value does not exceed the predetermined threshold value continuously for the predetermined period of time, the start specification step does not specify the operation start timing of the driving device.

18. A non-transitory computer-readable storage medium on which a program causing a computer to execute the sensor control method according to claim 17 is recorded.

19. An information processing method of processing a sensor value corresponding to an acceleration measurement result of at least one sensor coupled to a driving device comprising a plurality of joints, the information processing method comprising:
  a reception step of receiving the sensor value from the at least one sensor;
  a continuous excess detection step of detecting a continuous excess state, which is a state where an absolute value of the sensor value exceeds a predetermined threshold value continuously for a predetermined period of time, with respect to the at least one sensor,
  wherein the predetermined threshold value is determined according to a position where the sensor is coupled to the driving device; and
  a start specification step of specifying an operation start timing of the driving device in a change over time in the sensor value on the basis of a timing when the continuous excess state is detected with respect to the at least one sensor,
  wherein in the state the absolute value of the sensor value does not exceed the predetermined threshold value continuously for the predetermined period of time, the start specification step does not specify the operation start timing of the driving device.

20. A non-transitory computer-readable storage medium on which a program causing a computer to execute the information processing method according to claim 19 is recorded.

* * * * *